United States Patent [19]

Weinberg et al.

[11] Patent Number: 5,388,458
[45] Date of Patent: Feb. 14, 1995

[54] QUARTZ RESONANT GYROSCOPE OR QUARTZ RESONANT TUNING FORK GYROSCOPE

[75] Inventors: Marc S. Weinberg, Needham; Anthony Petrovich, Tewksbury, both of Mass.

[73] Assignee: The Charles Stark Draper Laboratory, Inc., Cambridge, Mass.

[21] Appl. No.: 981,167

[22] Filed: Nov. 24, 1992

[51] Int. Cl.⁶ .............................................. G01P 9/04
[52] U.S. Cl. ....................................... 73/505; 310/329
[58] Field of Search ..................... 73/505, 504, 510; 310/329, 370

[56] References Cited

U.S. PATENT DOCUMENTS

| | | | |
|---|---|---|---|
| Re. 32,931 | 5/1989 | Staudte | 73/505 |
| Re. 33,479 | 12/1990 | Juptner et al. | 73/505 |
| 3,696,429 | 10/1972 | Tressa | 343/180 |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,336,718 | 6/1982 | Washburn | 73/517 B |
| 4,414,852 | 11/1983 | McNeill | 73/765 |
| 4,524,619 | 6/1985 | Staudte | 73/505 |
| 4,590,801 | 5/1986 | Merhav | 73/510 |
| 4,628,734 | 12/1986 | Watson | 73/505 |
| 4,671,112 | 6/1987 | Kimura et al. | 73/505 |
| 4,727,752 | 3/1988 | Peters | 73/517 AV |
| 4,735,506 | 4/1988 | Pavlath | 356/350 |
| 4,761,743 | 8/1988 | Wittke | 364/484 |
| 4,834,538 | 5/1989 | Heeks et al. | 356/350 |
| 4,898,032 | 2/1990 | Voles | 73/505 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,090,809 | 2/1992 | Ferrar | 356/350 |
| 5,094,537 | 3/1992 | Karpinski, Jr. | 356/350 |
| 5,131,273 | 7/1992 | Tabata et al. | 73/505 |
| 5,138,883 | 8/1992 | Paquet et al. | 73/504 |
| 5,205,171 | 4/1993 | O'Brien et al. | 73/517 B |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |

FOREIGN PATENT DOCUMENTS

WO90/10196  9/1990  WIPO ................. G01C 19/56

OTHER PUBLICATIONS

Söderkvist, Jan, "A Mathematical Analysis of Flexural Vibrations of Piezoelectric Beams With Applications to Angular Rate Sensors," Comprehensive Summaries of Uppsala Dissertations from the Faculty of Science 244, Electronics Group, Dept. of Technology, Uppsala University, Uppsala, Sweden, pp. 1–139, ©1990.

Primary Examiner—Hezron E. Williams
Assistant Examiner—Helen C. Kwok
Attorney, Agent, or Firm—Weingarten, Schurgin, Gagnebin & Hayes

[57] ABSTRACT

A resonantly vibrating or tuning fork rate sensor in which a quartz beam is instrumented with electrodes in first and second regions forming respective sense and drive electrodes wherein the piezoelectric resonance affect of the quartz material between the drive electrodes is used as a tuning element for an oscillator circuit. The electrodes are driven in a balanced voltage mode and sensed in a common mode rejection differential amplifier while leads running to the electrodes along the quartz beam are placed at positions of minimal field strength for improving the signal to noise ratio of the device. The rate sensor utilizes a multi-electrode pattern in order to make such lead placement possible. The sense pattern and drive pattern may be either in one orientation with the drive electrodes proximate to the body of the quartz resonator or in a second pattern with the sense electrodes proximate to the body. Both the drive electrodes and the sense electrodes operate on the piezoelectric principal, utilizing constriction to induce vibration from the drive electrodes and sensing the current generated from piezoelectric effect resulting from the vibrational compression which occurs out of the plane of vibration during inertial rate input. Alternatively, a capacitive electrode structure may be utilized as a pick-off.

25 Claims, 4 Drawing Sheets

QUARTZ RESONANT GYROSCOPE OR QUARTZ RESONANT TUNING FORK GYROSCOPE

FIELD AND BACKGROUND OF THE INVENTION

The present invention relates to solid state inertial rate sensors and particularly to a resonant beam or tuning fork rate sensor or gyroscope. The use of a homogeneous mass of material exhibiting piezoelectric properties, such as quartz, for sensing of inertial rate is known and several examples of its implementation are in the literature. Basically, such a rate sensor operates on the tuning fork principal of the Cariolis acceleration and utilizes the piezoelectric effect to induce tuning fork vibration in response to voltage applied to drive electrodes applied to each of the tuning fork tines to produce an enplane vibration and further operates by sensing the current generated by piezoelectric compression in the tines in vibrations out of the plane induced by inertial rate inputs.

Because the quartz material is electrostatically alive with field potentials due to the use of piezoelectrically induced vibrations such a quartz rate sensor tends to be a fairly noisy device owing to the presence of electrostatic fields throughout the quartz material which can interfere with the sensing electrodes and their electrical connectors and in addition, the sense circuits are electrostatically coupled to the drive voltage. In addition, the generation of an accurately controlled oscillation frequency and amplitude from an external oscillator requires expensive and precise compensation for the significant thermal effect on the quartz modulus of elasticity.

BRIEF SUMMARY OF THE INVENTION

The present invention provides a quartz material vibrating beam or tuning fork inertial rate sensor having advantageous structure and circuitry which avoid these and other problems of the prior art. In particular, the oscillations utilized to piezoelectrically induce vibration in the tuning fork are developed utilizing the tuning fork quartz crystalline material as an oscillation frequency control due to its resonant properties. This couples the thermal changes in the properties of the quartz material into the oscillator frequency avoiding the introduction of thermal errors attributable to such changes.

In order to reduce the effects of interference between the drive and sensing components of the rate sensor, the drive electrodes are driven at balanced plus and negative potentials insuring that there will exist a plane of zero electric field potential throughout the length of each tine. In the case where the sense electrodes are placed distally from the body, their connecting electrodes are run along the plane of zero potential to minimize interference. The sense electrode currents are sensed by a common mode rejecting differential input, effectively sensing at potentials balanced about zero. In the case where the drive electrodes are located distally and their drive connectors must pass through a region of sense electrodes, those leads are similarly placed at the points of zero field strength plane for the sense electrodes in order to have minimal effect. The differential amplification further reduces the effect of common mode noise and, where gain adjustments are separately provided, a further calibration to reduce noise may be achieved.

BRIEF DESCRIPTION OF THE DRAWING

These and other features of the present invention are more fully set forth below in the detailed description, presented for exemplary purposes, of the preferred embodiment and in the accompanying drawing of which.

DETAILED DESCRIPTION

Figure 1:
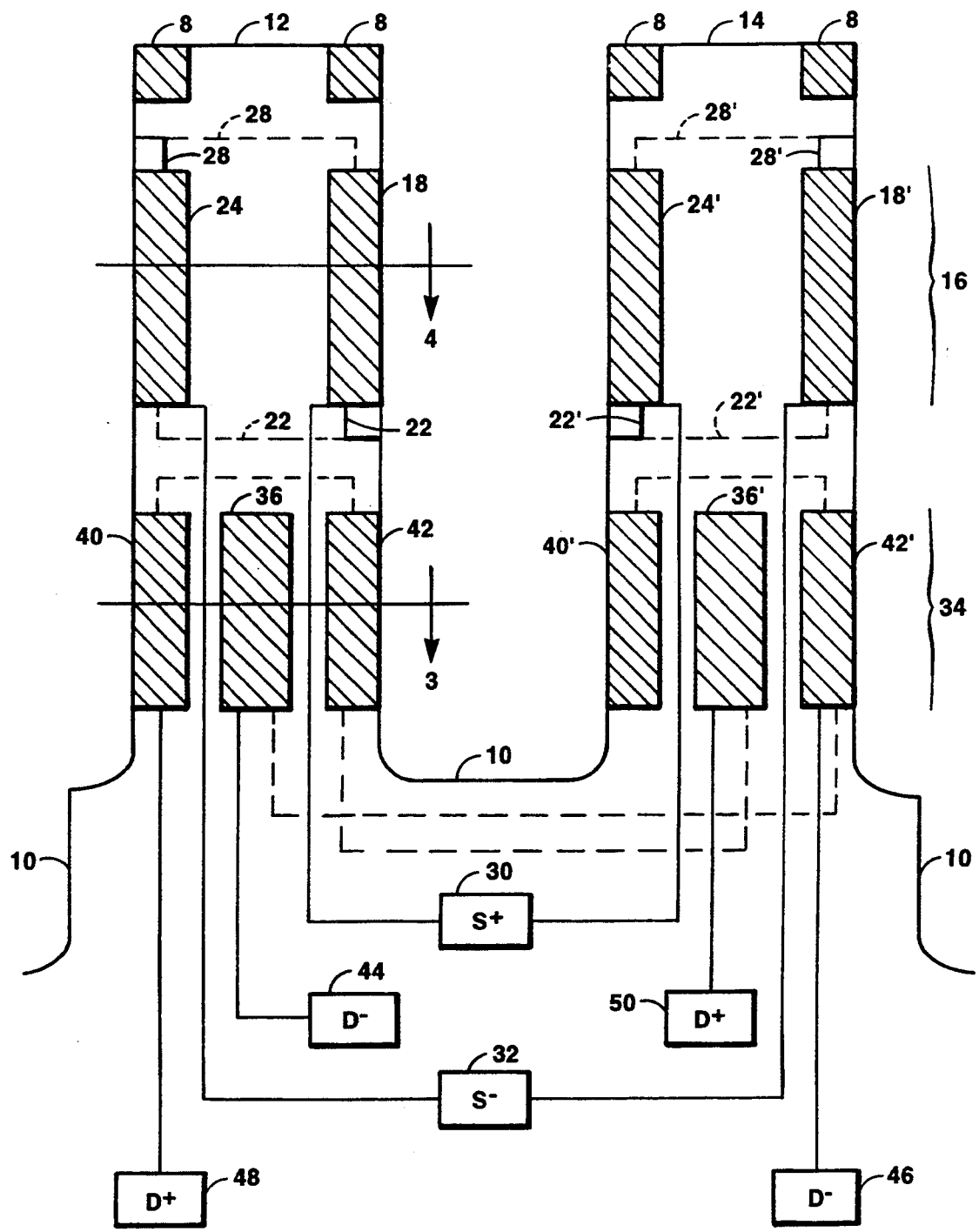
FIG. 1 is a Z axis view of a first embodiment of a rate sensor according to the present invention.

According to a first embodiment of the invention in FIG. 1, a body 10 of quartz piezoelectric crystalline material has first and second tines 12 and 14 each typically 2.5–10 mm long and approximately 100–500 microns wide and 100–500 microns high in the Z dimension in and out of the page. The crystal orientation has been achieved by a Z axis cut, slightly rotated about the X axis (the horizontal axis in the plane of the page, and the axis of vibration of the tuning fork) in order to minimize thermal effects on Young's modulus as it relates to the vibrational characteristics of the tines 12 and 14.

Figure 4:
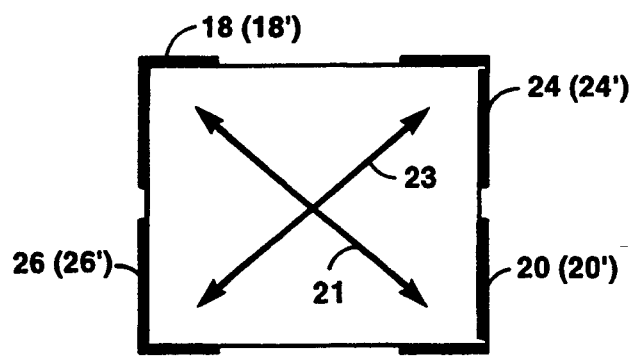
FIG. 4 is a sectional view of the sense electrode structure for the embodiments of FIG. 1 and FIG. 2.
Figure 6:
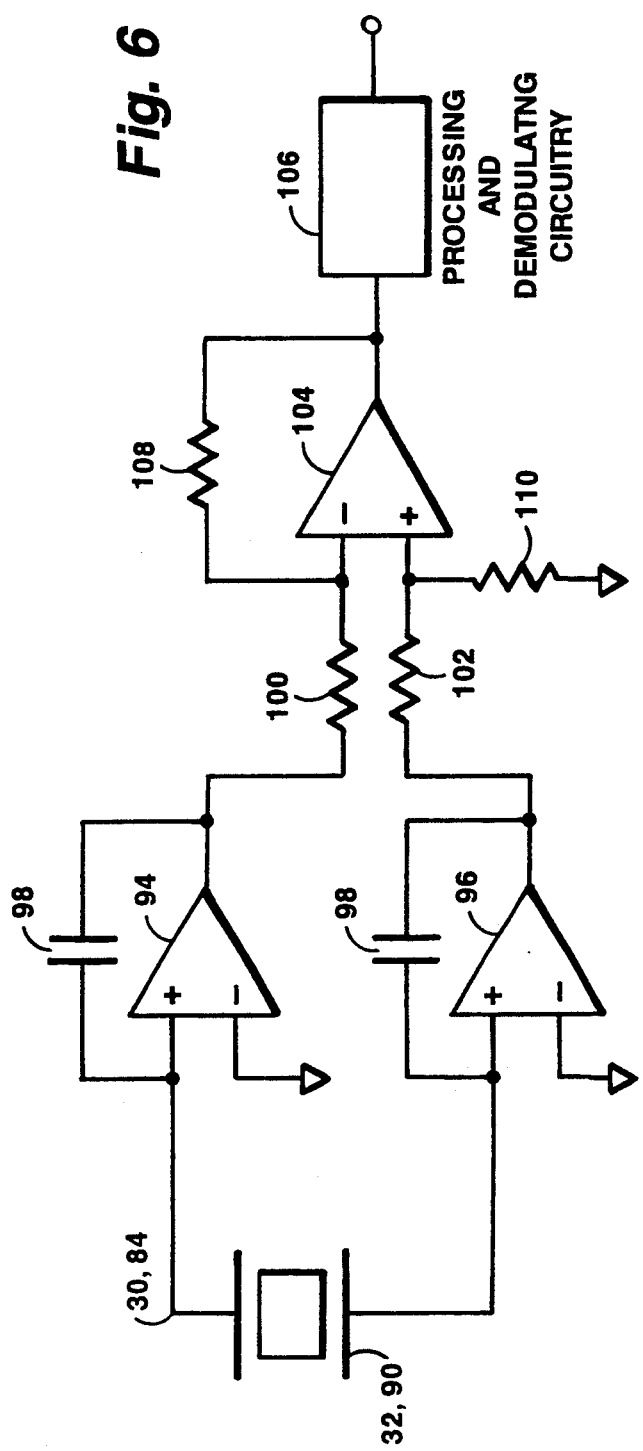
FIG. 6 is a circuit diagram of a differential amplifying input common mode rejecting circuit for sense electrodes.

In the embodiment of FIG. 1, a first region 16 of the tines 12 and 14 comprises a set of sense electrodes, one located on each corner of each tine 12 and 14. As illustrated more completely in FIG. 4 opposite electrodes 18 and 20, facing each other along a first axis 21, are typically connected by an electrical connector 22 on the quartz material itself. Similarly, opposite electrodes 24 and 26, facing each other along a second axis 23 orthgonal to the first axis 21, are connected by connectors 28 plated onto the quartz. The tine 14 is similarly instrumented with electrodes 18', 20', 24' and 26' and leads 28' and 22'. The electrodes 18, 20, 24' and 26' are connected to a sensing pad 30 from which connections to one of differential inputs of a sense circuit shown in FIG. 6 may be taken. Similarly the electrodes 20', 18', 24 and 26 are connected to a terminal pad 32 from which electrical connection to the other differential input of the sensing circuit shown in FIG. 6 is taken.

Figure 3:
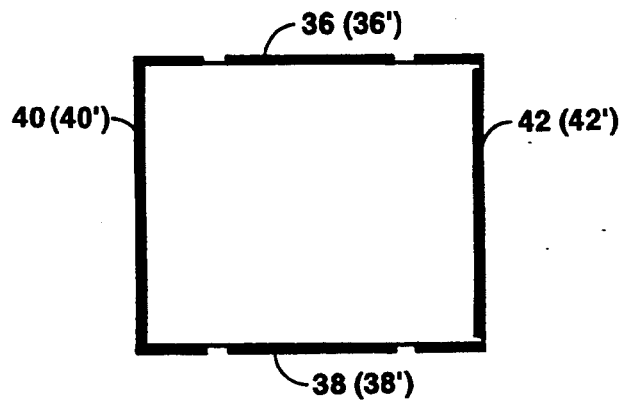
FIG. 3 is a sectional view of the electrode structure for drive electrodes for the FIG. 1 and 2 embodiments.

A second region 34 in the embodiment of FIG. 1 in each tine 12 and 14 is utilized for drive electrodes. In this case first and second, facing electrodes 36 and 38 are provided. Similarly on the tine 14 top and bottom electrodes 36' and 38' are provided as well. Substantially U shape or trough shape electrodes 40 and 42 (ideally vertical plates) are placed along the sides of the tines 12, and 40' and 42' on the sides of the tines 14, as more fully illustrated as well in FIG. 3. The electrodes 36, 38, 40' and 42' are all electrically excited at a first polarity and may be so coupled through separate pads 44 and 46, in order to minimize interference effects, or combined in a single pad. Likewise the electrodes 36' 38', 40 and 42 are all electrically connected to the same, opposite polarity of drive excitation typically through separate pads 48 and 50 for similar isolation effects, although the same pad may be utilized.

Figure 5:
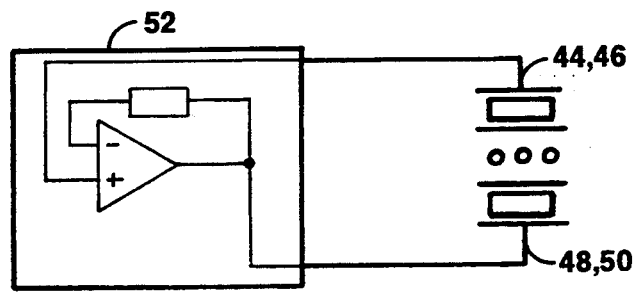
FIG. 5 is a circuit diagram of a drive electrode oscillator utilizing the piezoelectric effect of the quartz material in the beam for defining frequency of oscillation.

The leads from the sense electrodes 18, 18', 20, 20', 24, 24', 26 and 26' to the pads 30 and 32 pass centrally between the electrodes 36, (36'), 40 (40'), and 42 (42') in a region of neutral electrostatic field potential within the piezoelectric quartz material of the tines 12 and 14 when driven, as noted above at opposite polarities balanced about a zero common point for the detection circuitry as discussed below. FIG. 5 illustrates drive circuitry for the drive electrodes in region 34 and includes a circuit 52 in which the piezoelectric material between the drive electrodes, as may be seen between the contact pads 44, 46 on the one hand and 48, 50 on the other hand (in parallel or, separately if serial), act as the frequency determining element for the oscillator of circuit 52 as is known in the art, for example of quartz watch control. The typical frequency of oscillation for this circuitry 52 in conjunction with the piezoelectric material of the present invention will be 10 kHz. The dimensions of the tines 12 and 14 are selected to provide a quartz crystal resonant at that approximate frequency range when driven through the drive electrodes illustrated above. Regions 8 can be trimmed to achieve dynamic and static balancing so as to cancel or eliminate coupling of drive motions to the sense areas.

Figure 2:
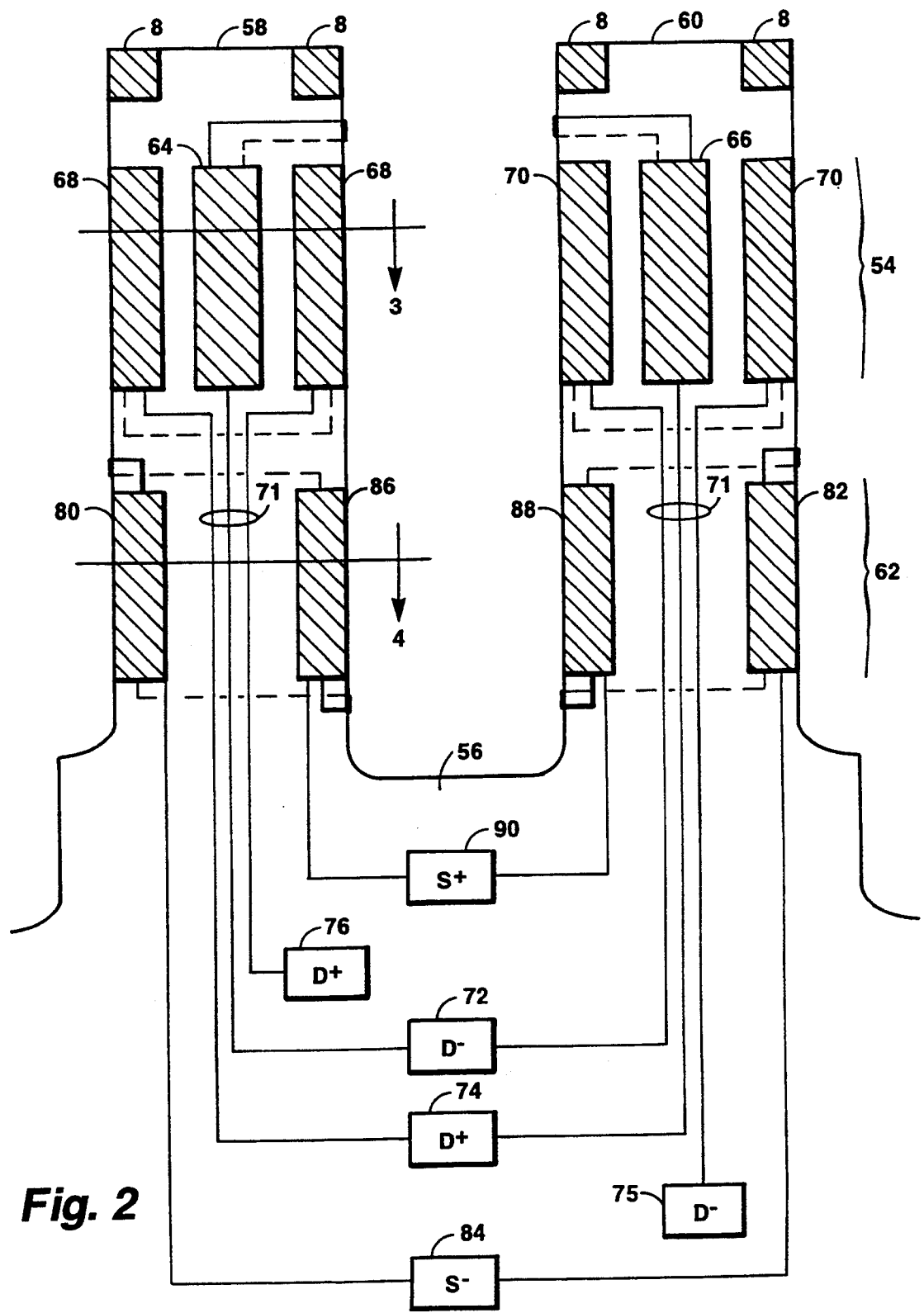
FIG. 2 is a Z axis view of a second embodiment of a rate sensor according to the present invention.

FIG. 2 illustrates a second embodiment of the invention which is distinguished from FIG. 1 in that a first region 54 remote from a body 56 of quartz material on each of two tines 58 and 60 contains the drive electrodes corresponding to the electrodes of region 34 in FIG. 1. Similarly a second region 62, proximate to the body 56, contains the sense electrodes corresponding to the sense electrodes of FIG. 1.

In this embodiment two drive electrodes 64 face each other on tine 58 and two drive electrodes 66 face each other on tine 60. Similarly two drive electrodes 68, of U shape or trough shape face each other on tine 58 while two similarly shaped electrodes 70 face each other on tine 60. The drive electrodes 64, 66, 68, 70 have their excitation conductors brought together in symmetrical, equally spaced paths 71 to pass through the region 62 of sense electrodes in a center position, using effectively two conductors from each electrode 68, 70 so as to provide common mode rejection for the sense electrodes. This minimizes error effects from stray signals of these drive electrodes. This is typically along a zero electrostatic field plane in the induced electrostatic field caused by the vibration of the tuning fork of FIG. 2. The commonly driven drive electrodes 64 and 70 are connected to separate pads 72 and 75 for isolation of interference but may be separated as desired. The commonly driven, of opposite polarity, drive electrodes 66 and 68 are connected to connection pads 74 and 76 to prevent crossing of leads.

Within the sensor region 62, the opposite corner sense electrodes 80 of tine 58 along with the diagonally orthogonal, opposite corner electrodes 82 of tine 60 are connected to a common (or separate) sense pad 84. Similarly the opposite corner sense electrodes 86 on tine 58 and the opposite corner sense electrodes 88, on diagonally orthogonal opposite corners from each other, are connected to a sense terminal pad 90.

With reference to FIG. 6 the preamplification circuitry for sensing rate inputs is illustrated and as typically shown includes a first piezoelectric current sensing input, which may be connected to pads 30 or 84, applied to an inverting input of a first differential amplifier 94 while the terminal pads 32 and 90 are connected to an inverting input of a further differential amplifier 96. Both amplifiers 94 and 96 have stabilizing negative feedback loop capacitors 98 and, as needed, resistors of high value have the non-inverting inputs connected to ground, the common point about which the drive polarity for the drive electrodes is evenly balanced. Both ends of the sense electrodes are thus held at virtual ground so a low impedance is seen and noise reduced. The outputs of the amplifiers 94 and 96 are applied through respective resistors 100 and 102 to differential, inverting and non-inverting, inputs of a further differential amplifier 104 and the output of amplifier 104 is applied through further processing and demodulating circuitry 106 as desired. The amplifier 104 has a gain determining feedback resistor 108 in a negative feedback path therearound and a biasing resistor 110 to ground from the non-inverting input.

Because of the high Q of the quartz vibrating material open loop operation is typical and it is unnecessary to run a feedback loop from the output of the circuitry 106 to restore a steady state condition.

Figure 7:
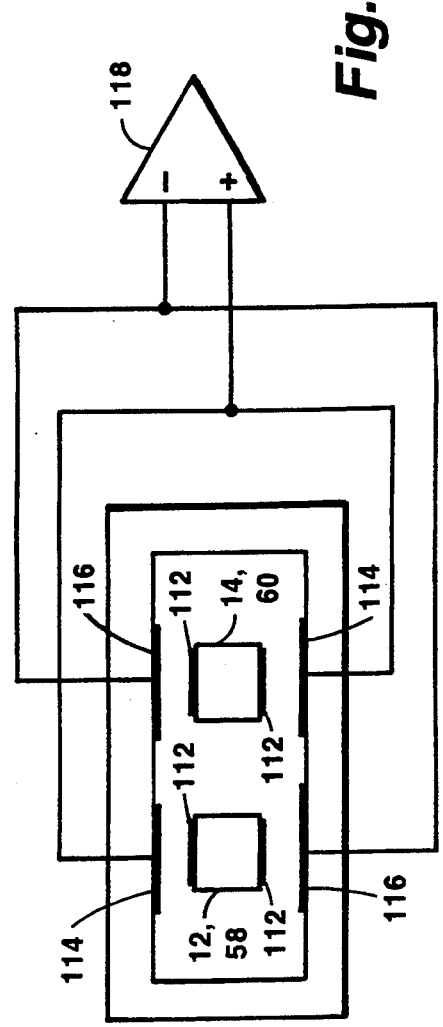
FIG. 7 is a diagram illustrating capacitive pick-off of rate sensitive motion of the tuning fork of the present invention.

In an alternative embodiment to piezoelectric sensing illustrated by the sensors of regions 34 and 62, FIG. 7 illustrates capacitive pick-off in which the tines 12 or 58 and 14 or 60 have plated on their upper and bottom surfaces electrodes 112 which are typically driven at some AC excitation from a source, not shown. Pick-off electrode sets 114 and 116 are respectively applied to non-inverting and inverting inputs of an amplifier 118.

In operation, the excitation of the drive electrodes in regions 16 and 54 of FIGS. 1 and 2 establishes an electrostatic field within the tines 12, 14, 58 and 60 causing them to vibrate toward and away from each other in the Y axis, horizontally in the plane of the drawing. The frequency of vibration is typically trimmed to be very close to resonance. Typically only a few volts is required to be applied to the drive electrodes to induce this vibration. A rate or rotation of the tuning forks of FIGS. 1 and 2 about the X axis, the axis of elongation of the tines and running vertically in the drawing of FIGS. 1 and 2, causes out of plane vibration in the Z axis. The electrostrictive effect in the regions 34 and 62 of the sense electrodes causes a small piezoelectrically induced current to flow in directions which can be sensed by the sense electrodes as illustrated above and detected by common mode differential input amplification circuit to provide a useful measure of the angular rate about the X axis.

Figure 3A:
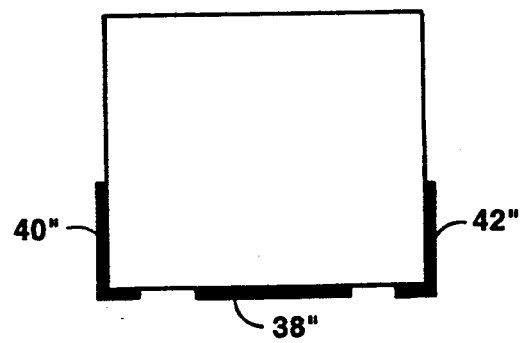
FIG. 3A is a section view of an electrode structure from FIG. 3, modified.

In a further embodiment, the drive electrodes are placed near the closed end of the structure and the sense electrodes are at the open end part of the tines. The drive electrodes are applied only to the bottom (or top) of each tine as shown in FIG. 3A where the electrodes 38″, 40″ and 42″ have the function of electrodes 38, 40 and 42 of FIG. 3.

The above described embodiments of the invention are intended as exemplary only. The scope of the invention is solely limited in accordance with the following claims.

We claim:

1. A quartz material tuning fork rate sensor comprising:

at least one elongated quartz member projecting from a body and vibrationally responsive to electrical stimulation;

first and second regions of said member located at different distances from said body;

a set of drive electrodes in said first region and having at least one first drive electrode spaced from at least one second drive electrode through said quartz material;

a drive circuit adapted for oscillation at a frequency determined by piezoelectric resonant properties of said first region of said member;

electrical drive leads coupling said at least one first and second drive electrodes to said drive circuit, said at least one first and second drive electrodes exciting vibration of said member in a plane having said member;

a set of sense electrodes in said second region and having at least one first sense electrode spaced apart from at least one second sense electrode on said quartz material, said at least one first and second sense electrodes positioned to receive current piezoelectrically induced therein in response to a rotation rate about said member; and a sense circuit coupled to said sense electrodes by electrical sense leads for detecting current piezoelectrically induced in said sense electrodes, said sense circuit including a differential input, having respective inputs connected to a first and second pairs of electrodes, balanced with respect to said drive circuit and providing common mode rejection at said sense circuit, said electrical drive leads disposed, on said member, along lines of minimal field strength in a field piezoelectrically induced from vibration of said member for coupling said drive electrodes to said drive circuit, and said electrical sense leads disposed, on said member, along lines of minimal field strength in an electric field induced by said drive electrodes for coupling said sense electrodes to said sense circuit.

2. The rate sensor of claim 1 wherein said first region is more proximate to said body.

3. The rate sensor of claim 1 wherein said second region is more proximate to said body.

4. The rate sensor of claim 1 wherein two said member with corresponding drive and sense electrodes are provided in side by side relationship wherein the vibration induced by oscillation is in the plane of the two said member.

5. The rate sensor of claim 4 wherein said member have an approximate cross sectional height and width of 100-500 microns each.

6. A quartz material tuning fork rate sensor comprising:

at least one elongated quartz member projecting from a body and vibrationally responsive to electrical stimulation;

first and second regions of said member located at different distances from said body;

a set of drive electrodes in said first region and having first and second drive electrodes of a first polarity facing each other along a first axis across said material and bordered by third and fourth drive electrodes of a second polarity facing each other across an orthogonal, second axis through said material;

a drive circuit adapted for oscillation at a frequency;

electrical drive leads coupling said first and second polarity drive electrodes to said drive circuit to excite vibration of said member at said frequency in a plane having said member;

a set of sense electrodes in said second region and having at least one first sense electrode spaced apart from at least one second sense electrode through said quartz material, said at least one first and second sense electrodes positioned to receive current piezoelectrically induced therein in response to a rotation rate about said member; and a sense circuit coupled to said sense electrodes by electrical sense leads for detecting current piezoelectrically induced in said sense electrodes, said sense circuit including a differential input, having respective inputs connected to a first and second pairs of electrodes, balanced with respect to said drive circuit and providing common mode rejection at said sense circuit, said electrical drive leads disposed, on said member, along lines of minimal field strength in a field piezoelectrically induced from vibration of said member for coupling said drive electrodes to said circuit, and said electrical sense leads disposed, on said member, along lines of minimal field strength in an electric field induced by said drive electrodes for coupling said sense electrodes to said sense circuit.

7. The rate sensor of claim 6 wherein two said member with corresponding drive and sense electrodes are provided in side by side relationship wherein the vibration induced by oscillation is in the plane of the two said member.

8. The rate sensor of claim 7 wherein, on each said member, said at least one first sense electrode consists of a first pair of electrodes on a first pair of opposite corners of said member and said at least one second sense electrode consists of a second pair of electrodes on a second pair of opposite corners of said member.

9. The rate sensor of claim 8 wherein said first region is more proximate to said body.

10. The rate sensor of claim 8 wherein said second region is more proximate to said body.

11. The rate sensor of claim 8 wherein said member have an approximate cross sectional height and width of 100-500 microns each.

12. The rate sensor of claim 8 wherein said drive electrodes and the piezoelectric material between said drive electrodes are incorporated in said drive circuit as a resonance determining element.

13. A quartz material tuning fork rate sensor comprising:

at least one elongated quartz member projecting from a body;

first and second regions of said member located at different distances from said body;

a set of drive electrodes in said first region and having at least one first, first polarity drive electrode spaced from at least one second, opposite polarity drive electrode through said quartz material;

an oscillator circuit adapted for oscillation at a frequency;

electrical drive leads coupling said first and second drive electrodes to said oscillator circuit causing vibration of said member in a plane having said member;

a set of sense electrodes in said second region and having at least one first sense electrode spaced apart from at least one second sense electrode through said quartz material, said at least one first and second sense electrodes positioned to receive current piezoelectrically induced therein in response to a rotation rate about said member;

a sense circuit coupled to said sense electrodes by electrical sense leads for detecting current piezoelectrically induced in said sense electrodes; and means providing a common mode rejection input for said sense circuit, said electrical drive leads disposed, on said member, along lines of minimal field strength in a field piezoelectrically induced from vibration of said member for coupling said drive electrodes to said oscillator circuit, and said electrical sense leads disposed, on said member, along lines of minimal field strength in an electric field induced by said drive electrodes for coupling said sense electrodes to said sense circuit.

14. The rate sensor of claim 13 wherein said common mode rejection input means includes a differential input balanced with respect to the polarities of the drive electrodes to minimize the effect on said sense circuit of oscillations applied to said drive electrodes from said oscillator circuit.

15. The rate sensor of claim 14 wherein two said member with corresponding drive and sense electrodes are provided in side by side relationship wherein the vibration induced by oscillation is in the plane of the two said member.

16. The rate sensor of claim 15 wherein said first region is more proximate to said body.

17. The rate sensor of claim 15 wherein said second region is more proximate to said body.

18. The rate sensor of claim 15 wherein the polarities of said drive electrodes are driven by said oscillator circuit balanced with respect to the differential input of said sense circuit to provide said common mode rejection at said sense circuit.

19. The rate sensor of claim 15 wherein said member have an approximate cross sectional height and width of one quarter millimeter each.

20. The rate sensor of claim 15 wherein said drive electrodes and the piezoelectric material between said drive electrodes are incorporated in said oscillator circuit as a resonance determining element.

21. The rate sensor of claims 1, 6, or 13 wherein said quartz material crystal orientation with respect to said member is set to minimize the variation of Young's modulus with temperature.

22. The rate sensor of claims 1, 6, or 13 wherein said member is approximately one quarter to one half centimeter in length extending from said body.

23. The rate sensor of claims 1, 6 or 13 further including electrical drive leads to said drive electrodes through the region of sense electrodes positioned to provide common mode rejection avoiding noise to said sense electrodes.

24. The rate sensor of claims 1, 6 or 13 wherein said sensor circuit places said first and second sense electrodes at virtual ground.

25. The rate sensor of claims 1, 6 or 13 wherein said drive electrodes are placed on two opposite side surfaces and on one intermediate surface of said member.

* * * * *